Figure 1:
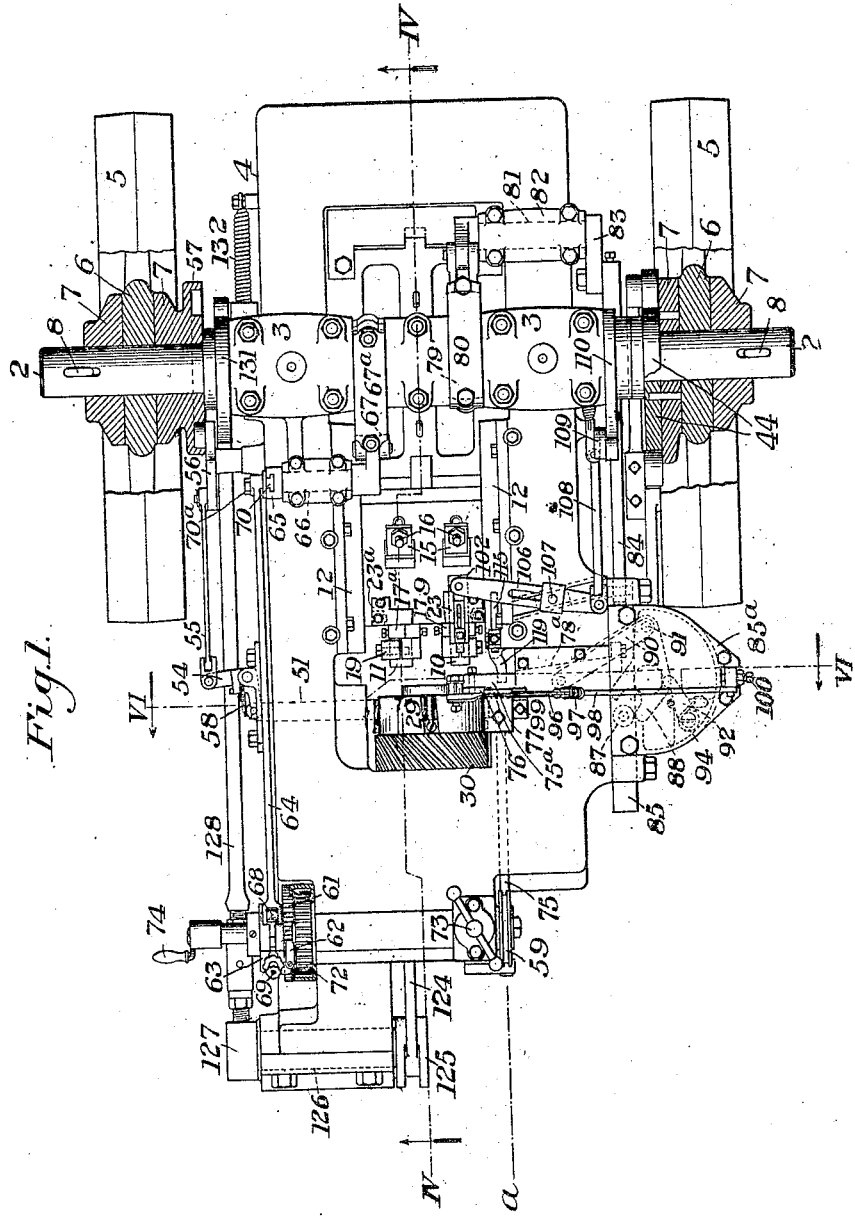

C. S. WEEKS.
COLD HEADING MACHINE.
APPLICATION FILED DEC. 8, 1906.

1,024,046.

Patented Apr. 23, 1912.
10 SHEETS—SHEET 1.

WITNESSES

INVENTOR

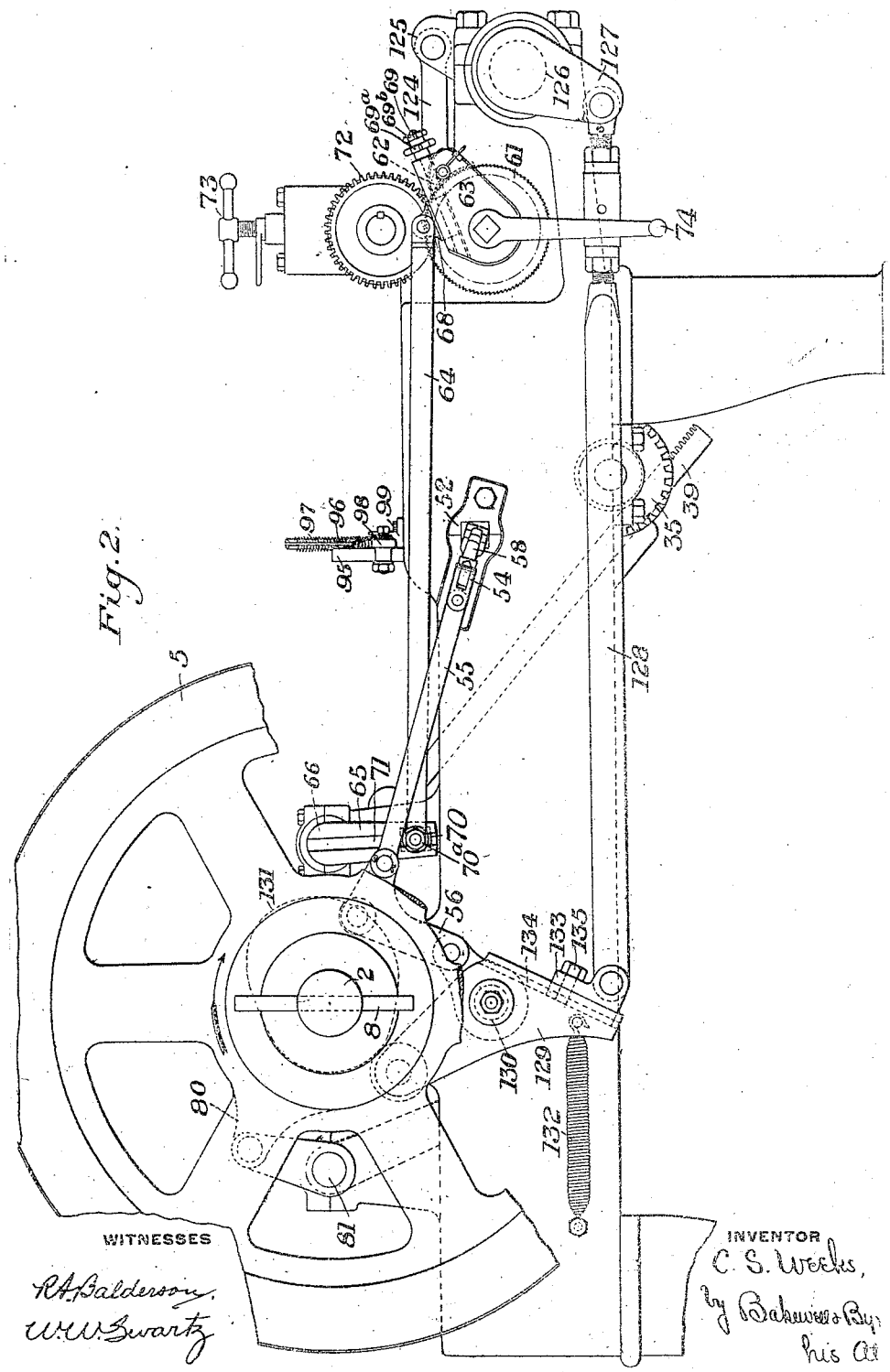

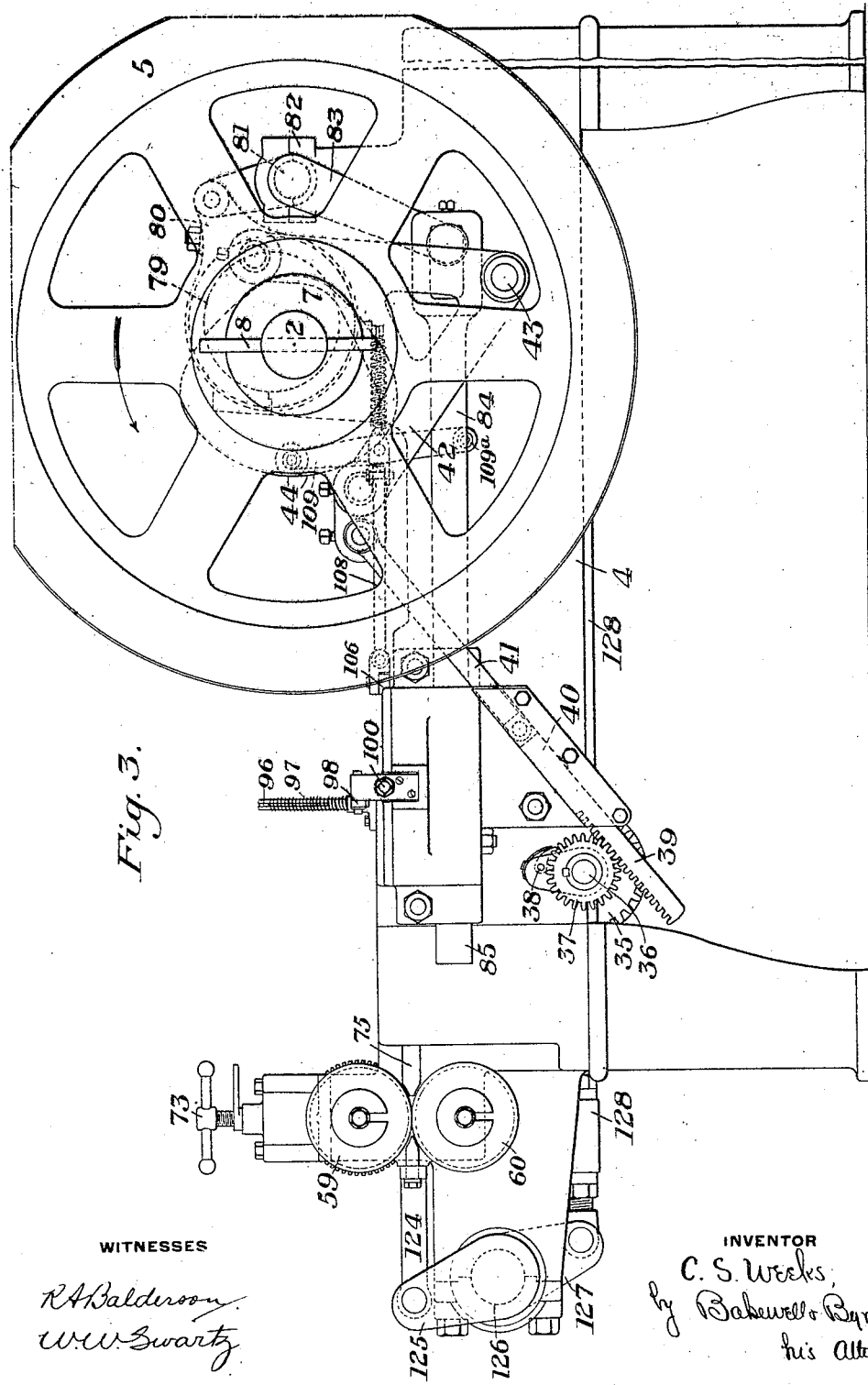

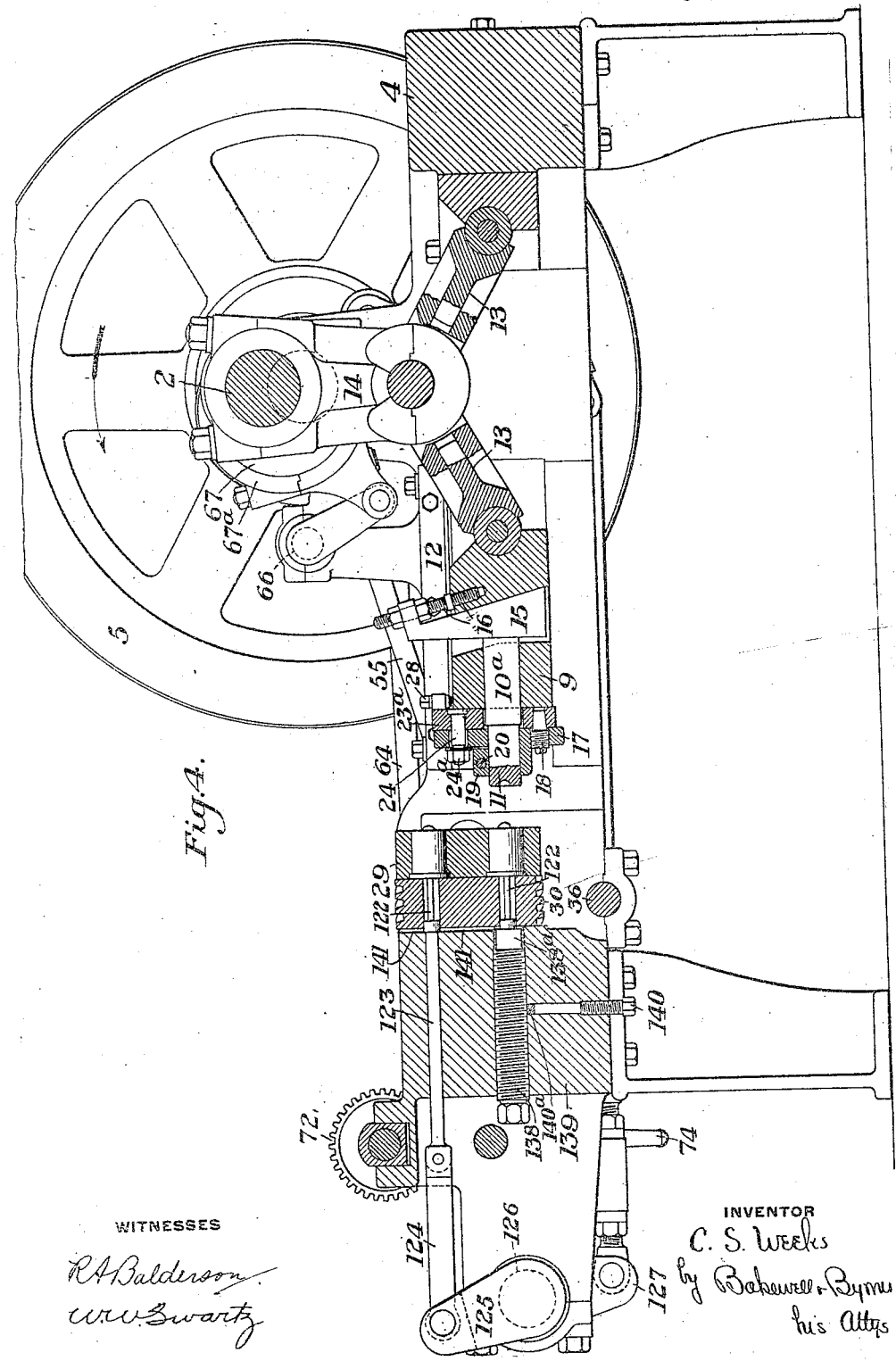

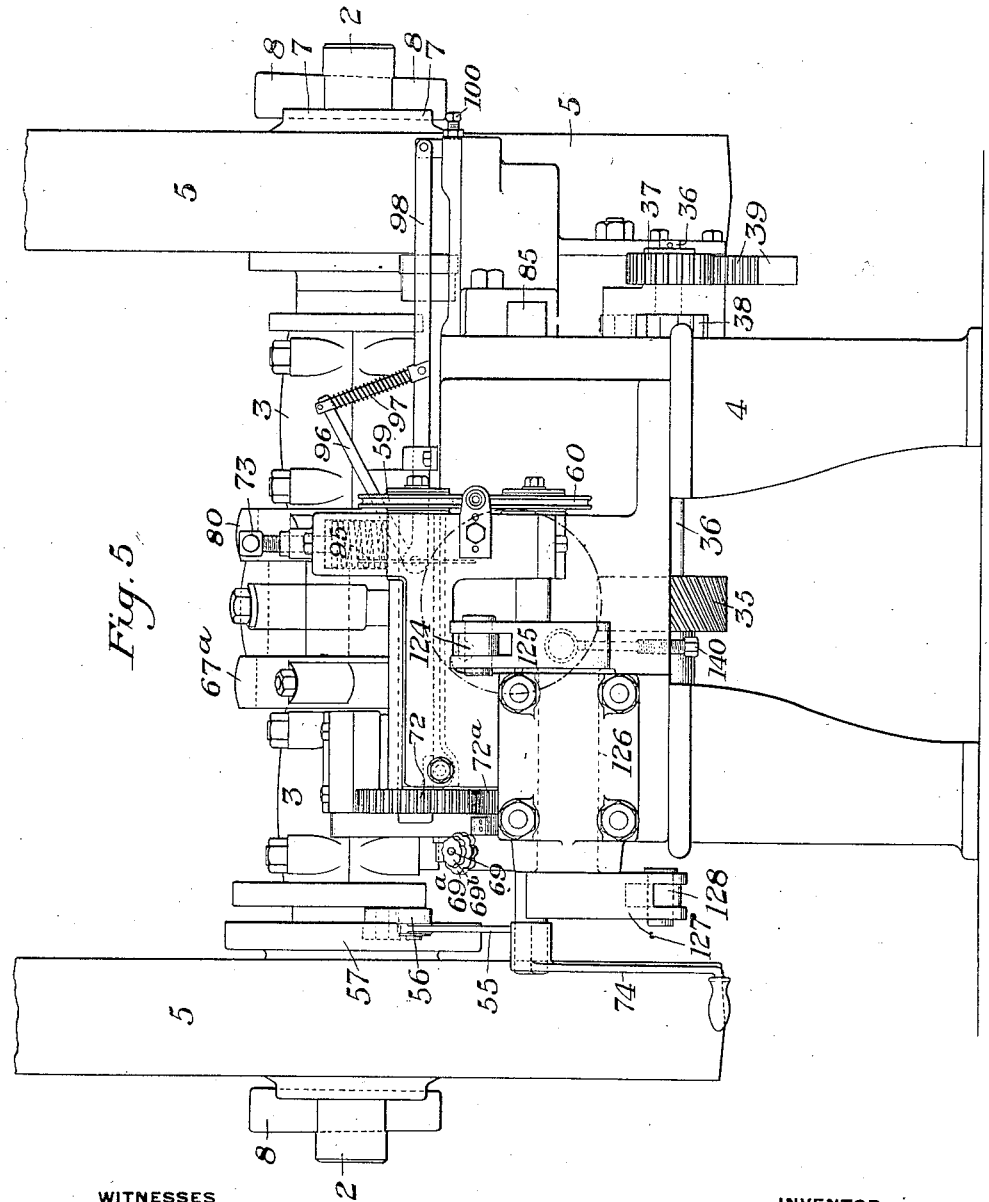

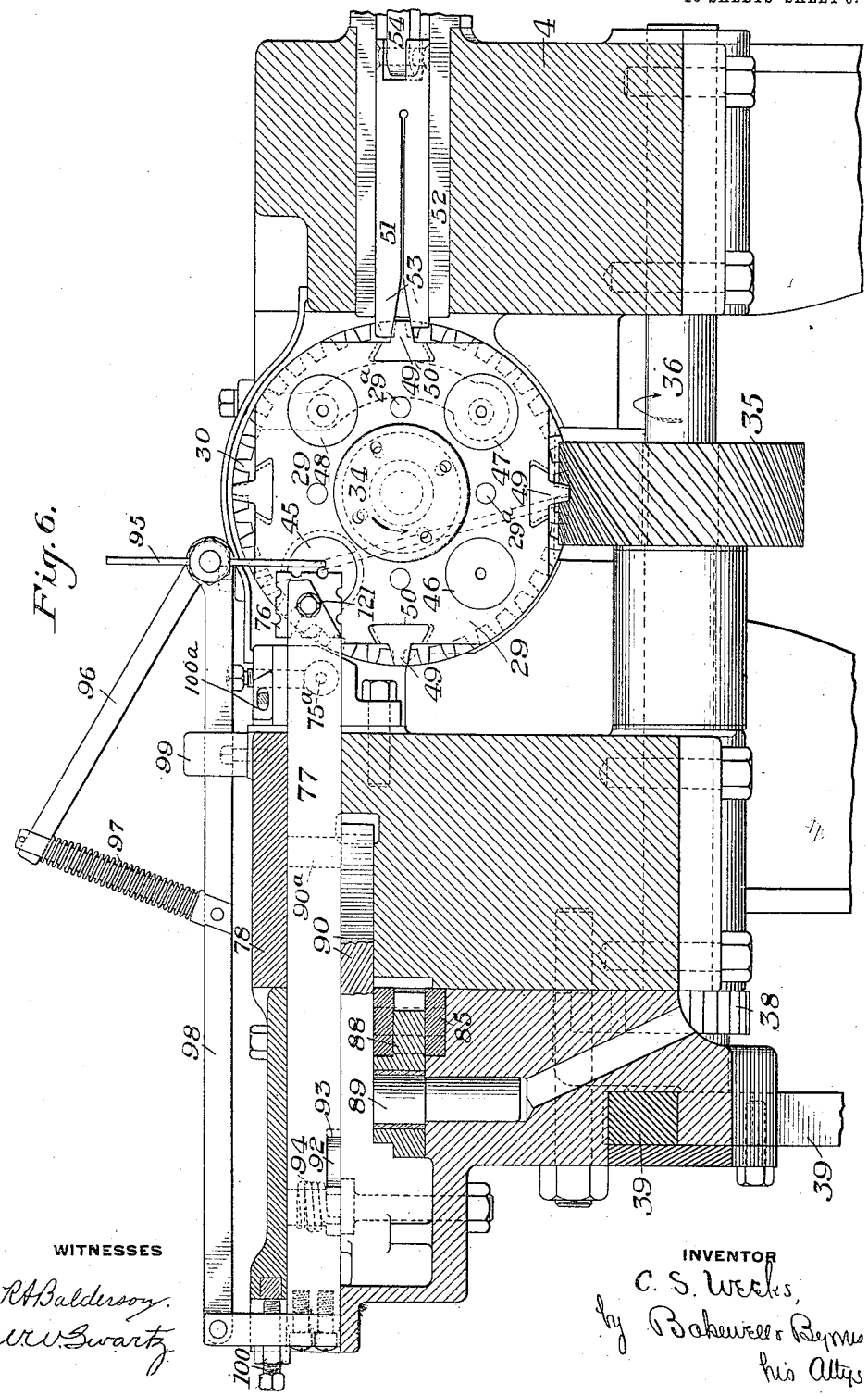

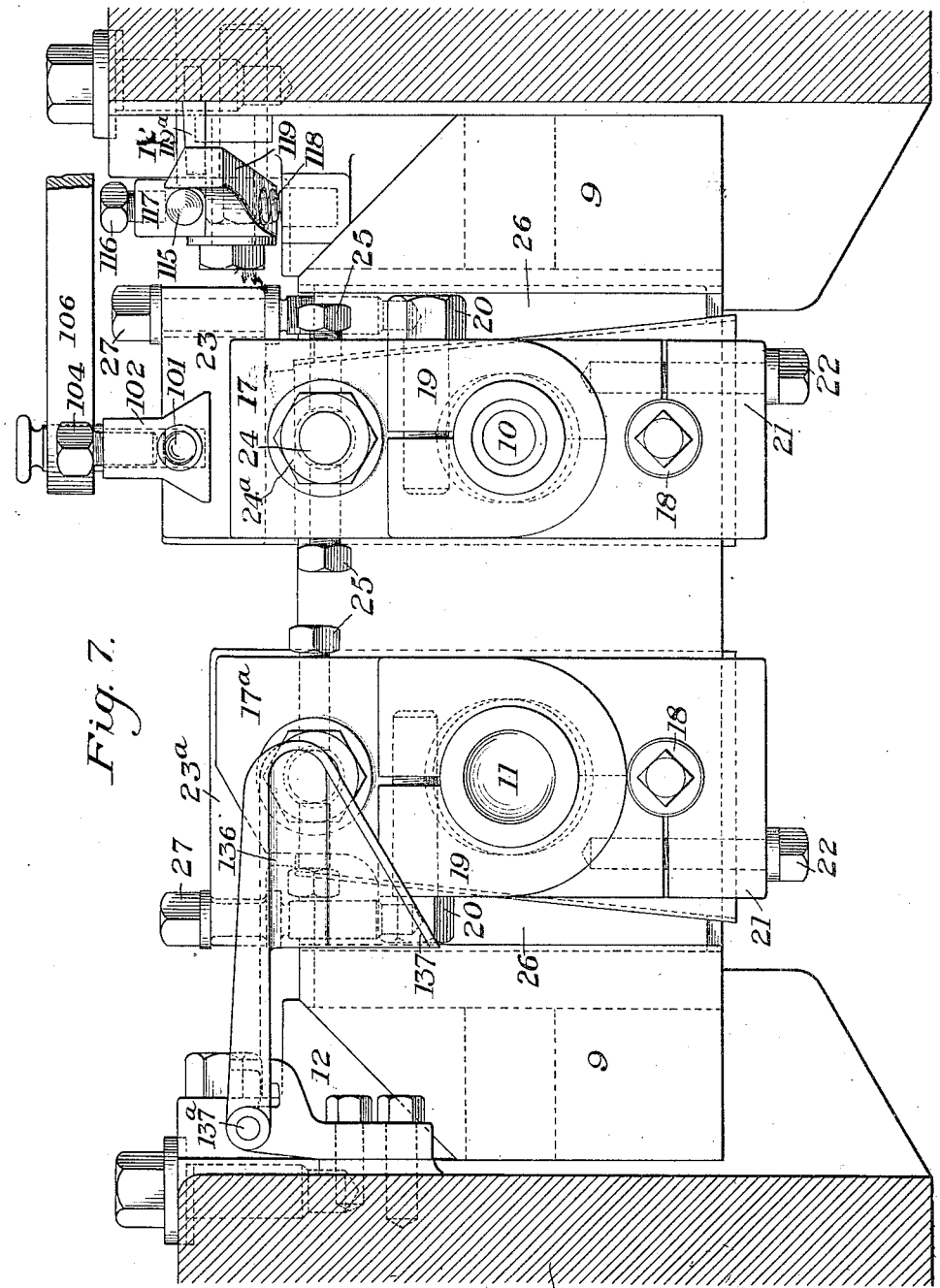

C. S. WEEKS.
COLD HEADING MACHINE.
APPLICATION FILED DEC. 8, 1906.
1,024,046.
Patented Apr. 23, 1912.
10 SHEETS—SHEET 8.
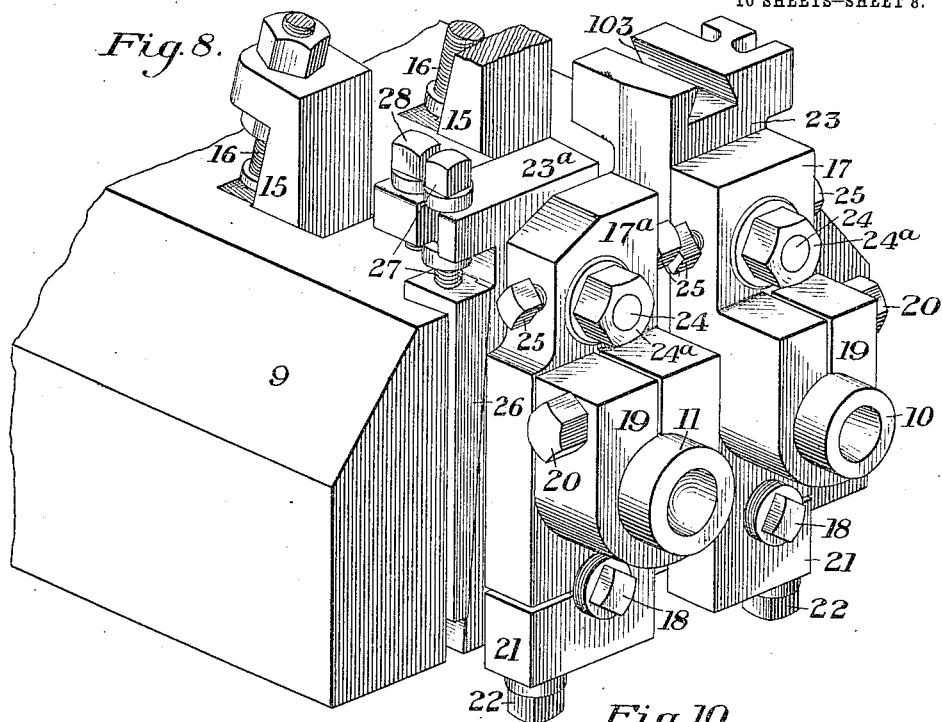
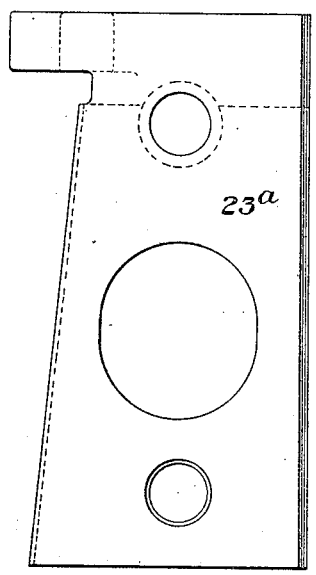
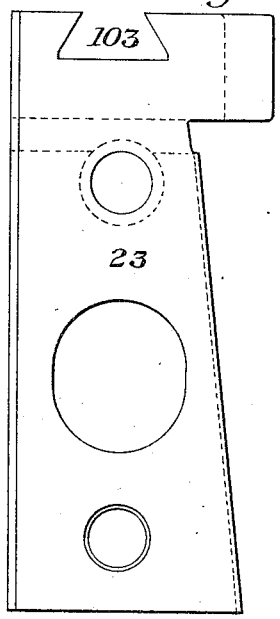
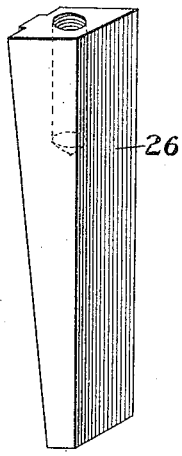
WITNESSES
INVENTOR
C. S. Weeks,
by Bakewell & Byrnes,
his Attys.

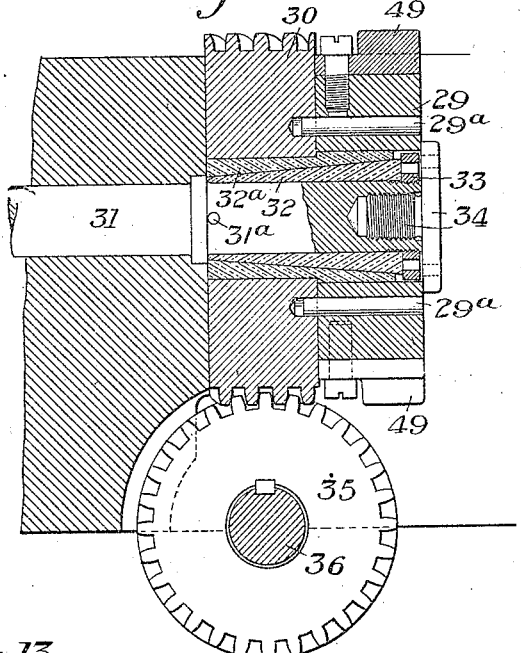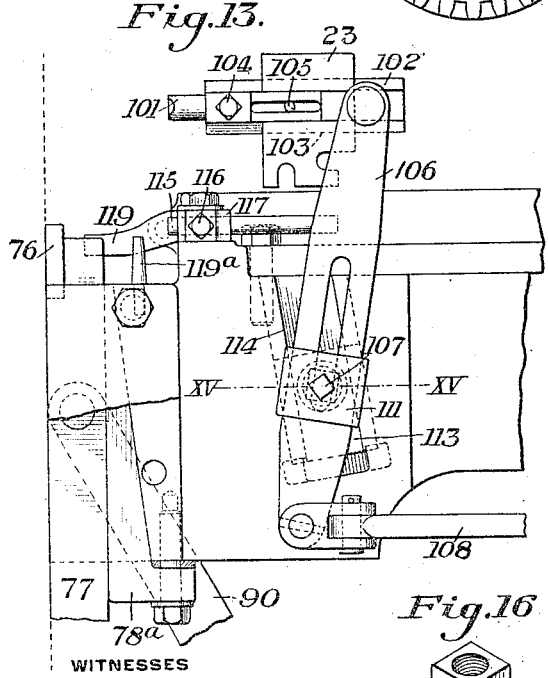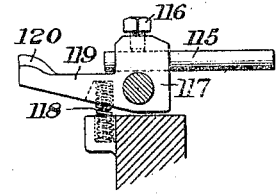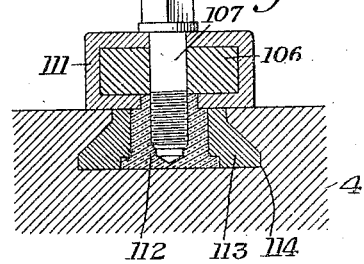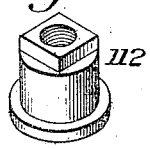

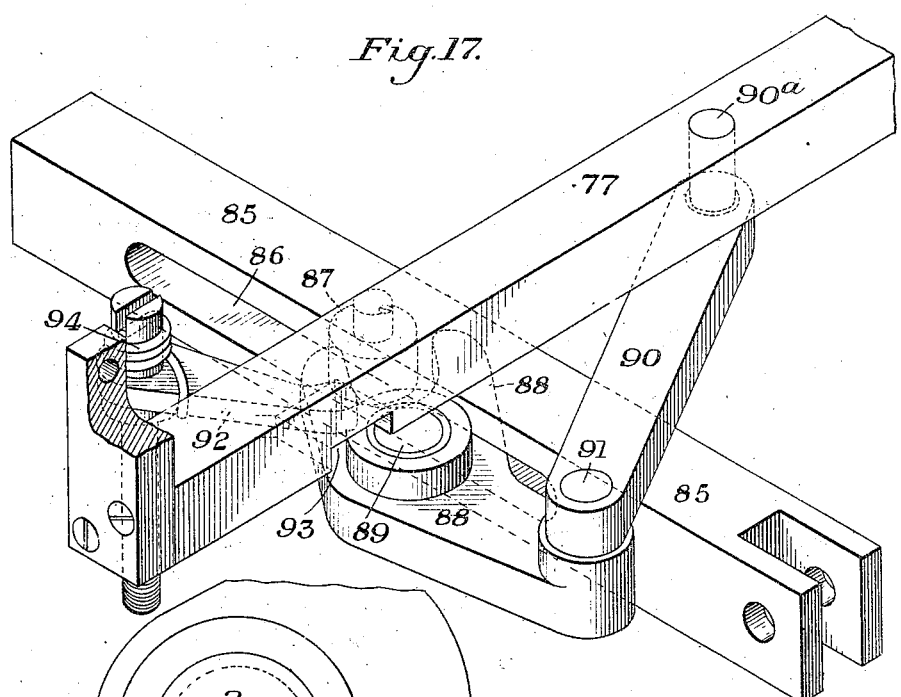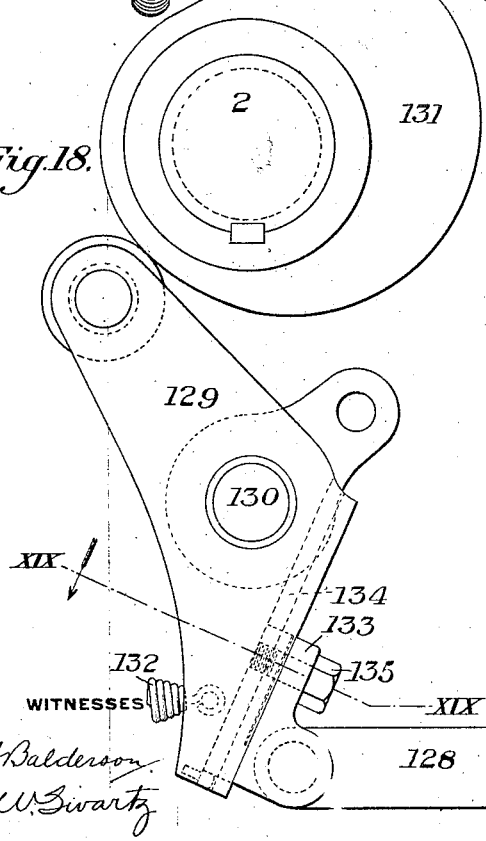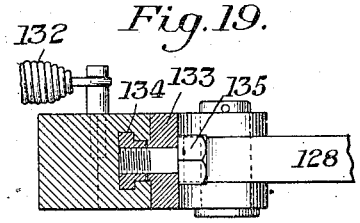

UNITED STATES PATENT OFFICE.

CHARLES S. WEEKS, OF PITTSBURGH, PENNSYLVANIA.

COLD-HEADING MACHINE.

1,024,046.

Specification of Letters Patent.   Patented Apr. 23, 1912.

Application filed December 3, 1906. Serial No. 846,926.

*To all whom it may concern:*

Be it known that I, CHARLES S. WEEKS, of Pittsburgh, Allegheny county, Pennsylvania, have invented a new and useful Cold-Heading Machine, of which the following is a full, clear, and exact description, reference being had to the accompanying drawings, forming part of this specification, in which—

Figure 1 is a plan view of a cold heading machine embodying my invention with some of the parts broken away. Fig. 2 is a side elevation of the same with the balance wheel partly broken away. Fig. 3 is a similar view looking at the opposite side of the machine. Fig. 4 is a longitudinal vertical section on the line IV—IV of Fig. 1. Fig. 5 is an end view of the machine from the feed-in end. Fig. 6 is a transverse section on the line VI—VI of Fig. 1, looking in the direction of the arrow. Fig. 7 is a similar view on a larger scale of a portion of the machine taken on the line VI—VI of Fig. 1, and looking in the opposite direction to Fig. 6. Fig. 8 is a perspective view showing the punches, their carriers and adjusting devices. Figs. 9, 10 and 11 are detail views of some of the parts by which the adjustment of the punches is effected. Fig. 12 is a sectional view of the turret, and its driving gears. Fig. 13 is a detail plan view of the push-in device. Fig. 14 is a detail view of the feed-stop depression device or pawl. Fig. 15 is a section on the line XV—XV of Fig. 13. Fig. 16 is a detail view of the swivel nut shown in Fig. 15. Fig. 17 is a perspective view showing the movement for operating the cut-off slide. Fig. 18 is a detail view showing the adjustment for the connecting rod of the knock-out mechanism. Fig. 19 is a sectional view on the line XIX—XIX of Fig. 18.

My invention has relation to cold heading machines for the manufacture of bolts and rivets.

The object of my invention is to largely increase the speed of production in machines of this character; to reduce the rapidity of motion of the punches and their operating mechanism for a given output of the machine; to shorten the movement of the punch-carrying head or gate; to use an adjustably fixed relief; and to improve the general construction, arrangement and mode of operation of the various parts of the machine, all as more fully hereinafter described.

In accordance with my invention, the machine is provided with a die carrier having a plurality of dies and stations, at least two of which are shaping stations, means for bringing the stock successively to the several shaping stations, and shaping punches arranged to act simultaneously upon the stock at the different shaping stations. In the preferred form of machine, the die-carrier is a rotary die-carrying head or turret having therein four dies. The stock is fed to the machine by suitable feeding mechanism, is cut to proper length, and the cut-off piece is moved over to the rotary head or turret and into one of the dies thereof. The turret is then given a quarter revolution, bringing the piece into position to be operated upon by the first punch, by means of which its head is partially shaped. The turret is then given another quarter revolution, bringing the piece to the action of a second, larger, finishing punch, by means of which the head is finished. The next quarter revolution of the turret brings the finished bolt or rivet to the knock-out position, where it is knocked out of the die by an intermittently operated device. During these operations, successive pieces of stock have been delivered in succession to the other dies, and are respectively carried through the cycle of operations just described. Both punches are carried by a single reciprocating head or gate, and the parts are so arranged that in one revolution of the machine the finishing punch performs its operation upon one piece of stock, while the first punch is acting upon a succeeding piece; a new piece of stock is inserted into an empty die, and a finished bolt or rivet is ejected from the machine. By the employment of the rotary turret arranged to operate in this manner, the rapidity of production is greatly increased, inasmuch as two operations are performed by each reciprocation of the punches, and the movement of the latter is much lessened, inasmuch as the necessity for retracting them a sufficient distance to permit the ejection of a formed bolt or rivet is obviated by the use of the independent ejecting station.

My invention also comprises means for positively and automatically locking the turret in each of its several positions, while the punches are operating, and for releasing such lock to permit the step by step movement of the turret; also, means of improved character for operating the cut-off slide; also means for securing independent universal adjustment of each punch, each adjustment being effected independently of the other adjustments; and also in various other novel features of construction, arrangement and combination of parts, all substantially as hereinafter described and pointed out in the appended claims.

In the accompanying drawings, the numeral 2 designates the main shaft of the machine, which is journaled in suitable bearings 3 at one end portion of the supporting frame 4. Secured to each end portion of the shaft 2 is a balance or driving wheel 5, the hub portion 6 of these wheels being shown as clamped between the friction members 7, which are forced into clamping engagement with the hubs by means of the wedge keys 8.

9 designates the reciprocating head or gate, which carries the two punches 10 and 11, and which is mounted to operate in suitable guides 12 of the frame 4. This head or gate 9 is reciprocated by means of the toggles 13, (Fig. 4), by the pitman 14 from a crank on the main shaft 2. The punches 10 and 11 are mounted in the forward part of this head and are given their proper forward and back adjustment by means of the vertically movable wedges 15 which are arranged to be moved up and down by means of the adjusting screws 16, and which act on the punches through the backing plugs 10$^a$. The punches 10 and 11 are provided with the clamping blocks 17 and 17$^a$, (see Fig. 8), each of which consists of a plate which is pivoted on the adjustably fixed tapered pin 18, (Fig. 4), for a limited lateral adjustment, and which is provided with the split clamping jaw 19 which is tightened upon the punch by a screw 20. The adjustment of this tapered pin 18 provides simple means for obtaining a perfect fit when first constructed and for maintaining such fit in use. Each clamping block 17 and 17$^a$ is also provided with the split portion or jaw 21, which, by means of a clamping screw 22, may be tightened upon the pivot pin 18. Each of the punch clamps 17 and 17$^a$ is secured to a punch plate 23 and 23$^a$ respectively by means of a bolt 24 and nut 24$^a$ and provided with the adjusting set screws 25. The plates 23 and 23$^a$ into which the punches extend, are mounted for vertical adjustment in the head or gate 9, and are secured in their proper adjustments by means of the lateral wedges 26 which are operated by screws 27. The head portion of each plate 23 and 23$^a$ is also provided with an adjusting screw 28. By loosening the nut 24$^a$, by means of the screws 25 the punch clamps 23 and 23$^a$ may be adjusted from side to side to effect the proper lateral adjustment of the punches, each punch being, as will be seen, adjustable independently of the other. By loosening the wedge screws 27, and actuating the adjusting screws 28, the punch plates 23 and 23$^a$ may be raised and lowered to effect the proper vertical adjustment of the punches. This adjustment is effected without in any way interfering with or disturbing the lateral and forward and back adjustments of the punches. By the means described, each punch can be exactly centered with respect to the work.

29 designates the rotary turret, which constitutes an important part of my invention. This turret is revolved by means of a spiral gear 30, to which it is removably secured by the internally tapered bushing 32$^a$ and the dowels 29$^a$, and is journaled on the fixed turret stud 31, (Fig. 12), by means of the externally tapered sleeve 32, which is removably secured by the screw ring 33 and dowel 31$^a$. The disk headed screw 34 supports the turret against the strain of ejecting the finished bolt or rivet. The gear 30 is actuated by means of the spiral pinion 35 secured to the shaft 36, which carries at its outer end, (Fig. 3), a spur pinion 37 having a pawl and ratchet connection 38 with said shaft 36. The wheel 37 is actuated by a toothed rack 39 of a reciprocating bar 40, having an actuating connection 41 with a two-roll rock lever 42, fulcrumed at 43 and actuated by a cam 44 on the main shaft 2. The pawl and ratchet connection 38 between the spur wheel 37 and the shaft 36 is so arranged that said shaft is actuated during but one stroke of the rack 39, the pinion 37 turning idly during the reverse stroke.

Formed in the turret 29 at equally spaced distances from each other and from the center of the turret, are four die seats, in which are placed four dies of uniform shape and size, with centrally located holes through them suited to the diameter of the body of the work to be headed and provided with flanges at their inner ends to prevent their being pushed out by the ejection of the finished work. These dies occupy successively the operative stations 45, 46, 47 and 48, (see Fig. 6).

For the purpose of locking the turret in each of its operative positions, it is provided with the peripherally located locking teeth 49, (Fig. 6). These teeth are seated in dovetailed grooves or recesses 50 of the turret, and their base portions are at an angle to the longitudinal axes of the teeth, for the purpose of facilitating their exact adjustment with respect to the dies and the locking device, as they may be readily moved back and forth in their seats until the desired adjustment is obtained, after which they are permanently fastened therein.

51 is a reciprocating locking device or dog which is mounted in a guide sleeve 52 in the frame, and which is formed with spring jaws 53 having a V-shaped recess between them adapted to receive and engage the beveled edges of the teeth 49. The dog 51 is actuated by means of the bell crank lever 54 connected by link 55 with a rocker 56 which is actuated by a cam 57 on the main shaft 2, the spring 58 normally acting to force the dog toward its engaging position. The cam 57 is so timed with respect to the cam 44 that the dog 51 will engage one of the teeth 49 at the time that the turret has completed each of its step by step movements, and will be withdrawn from such engagement at the time the turret is to be given its next movement. The spring 58 forms means for moving the dog 51 into locking engagement with the teeth of the turret; and the cam 57, through the connections described, constitutes positively actuated means for withdrawing the dog.

Relative to the direction of rotation of the turret, the nearer jaw of the dog 51 is preferably made somewhat shorter than the farther jaw, as shown in Fig. 6, so as to insure its catching the tooth 49. Owing to the spring character of the jaws of the dog, the walls of the V-shaped slot are caused to tightly fit the tooth, and the jaws 53 are tightly held in the guide sleeve 52, so that all looseness in the direction of rotation of the turret is taken up. The beveled shape of the teeth 49, together with the V-shape of the recess therefor in 51, also provides for any wear which may take place between the engaging surfaces.

The device described forms a positive lock which holds the turret in exact position, and which is quickly engaged and released by the actuating connections described.

The stock from which the bolts or rivets are formed is fed in on the dotted line $a$ of Fig. 1 by means of the peripherally grooved feed wheels 59 and 60.

Secured to the side of the lower feed shaft gear 72ª is a ratchet wheel 61, whose teeth are engaged by a spring-pressed pawl 62 carried by a pawl arm 63 freely pivoted on the hub of 72ª, and actuated through a connecting rod 64 by a depending arm 65 of a rocker shaft 66, actuated by an eccentric 67 and strap 67ª on the main shaft 2. The connection between the connecting rod 64 and the pawl-carrying arm 63 is effected by means of a sliding block or shoe 68, to which the connecting rod is pivotally attached and which is slidably mounted in the arm 63, (Fig. 2), its adjustment being effected by means of the screw 69, knob 69ª and clamping nut 69ᵇ. The other end of the connecting rod 64 is also adjustably connected to the rocker arm 65 by means of the sliding block 70 having a clamping nut 70ª, and engaging a groove 71 in the rocker arm. By means of these adjustments the stroke or throw of the pawl can be regulated to vary the feed of the stock, according to the fineness of the ratchet teeth. A plurality of pawls may be used to effect finer variations of the feed. The shafts of the two feed wheels 59 and 60 are intergeared by means of the spur toothed wheels 72 and 72ª. The shaft of the upper feed wheel 59 is vertically movable and tension for feeding is provided by means of the tension-screw 73 acting on a suitable tension spring.

74 designates a crank by which the operation of the feeding rollers may be performed by hand while setting the dies and punches. This is removed before power is applied to the machine. After passing through these feed rollers the stock enters the guide quill 75 and is fed to the point of cut-off 75ª. This cut-off is effected by means of the movable cutter 76 working by the die face 75ª through which the stock issues from the guide quill 75, (Fig. 6). The cutter 76 is carried and actuated by the longitudinally reciprocating bar 77 capped through the side of the frame 4 at 78.

78ª is an adjusting wedge for taking up the wear of the cut-off bar. This bar is periodically reciprocated by the mechanism now to be described.

On the main shaft 2 upon the opposite side of the pitman 14 from the eccentric 67, is an eccentric 79 having a strap 80 which actuates a rocker shaft 81 journaled in bearings 82, and which has a depending arm 83 from which a connecting rod 84 extends to a slide 85 mounted in the cut-off bracket 85ª and arranged at right angles to the cutter bar 77, (Fig. 17). The slide 85 is formed with a longitudinal slot 86 in which is journaled a roller 87 which is adapted to engage the forked arm of a bell crank lever or rocker 88 pivoted at 89 and having its longer arm connected by a link 90 with the cutter-bar 77 at 90ª. This mechanism is shown in detail in Fig. 17, and is also indicated in dotted lines in Fig. 1. As the slide 85 is reciprocated by the connecting rod 84, the roller 87 by its engagement with the slotted arm of the lever 88, actuates said lever to move its longer arm through an arc of a little more than 90 degrees. Figs. 1 and 17 show this lever at substantially its extreme position with the cutter bar moved forward after making the cut, and the roller 87 just passing out of engagement with said lever. A line through the centers of the pins 89 and 91 is approximately perpendicular to the side of the cutter-bar 77. Upon the reverse movement of the slide 85 the lever 88 is rocked in the reverse direction to return the cutter bar 77, and at the extreme of this movement the center of the pin 91, which connects the link 90 to said lever, is carried slightly beyond a line through the centers of the pins 89 and 90ª, thereby allowing the pawl 92 to temporarily lock the cutter bar in its retracted position.

92 is a spring-pressed pawl mounted on the cut-off bracket 85ª and engaging a wall of the recess 93 in the cutter bar 77. The tension of the spring 94 of this pawl is such as to assist in the forward movement of the cutter bar and to temporarily hold it in each of its extreme positions, while the roll 87 is out of engagement with the forked lever 88. This allows the cutter bar 77 to rest during such disengagements in its retracted position for the stock to be fed in front of the cutter 76 and in its forward position for the cut-off piece to be pushed into one of the turret dies by the push-in rod 101. No adjustment of the cutter bar is needed for its retracted position, since it is practical to so place the stock-cutter as to allow as much as $\frac{1}{32}$ of an inch clearance between the cutting edge of the latter and the side of the stock as it passes through the cut-off die 75ª.

The purpose of the mechanism just described is to provide for a quick retracting movement of the cutter bar 77 and its cutter, and for a slow advance or cutting movement of the same. This quick retracting movement of the cutter bar is of very great utility, especially in working with very short lengths of stock. Sometimes the stock is cut into lengths less than or not greater than its diameter; and unless the cutter bar can be retracted just as the piece of stock is entered into the forward end of the die, the push-in rod cannot act owing to the fact that the cutting tool is in the way; and it is impracticable to make the cutting tool of sufficient thinness to overcome this difficulty.

It will be seen by reference to Fig. 17 that at the time the roller 87 commences to act upon the lever 88 to retract the cutter bar, the relative positions of the said lever and of the link 90 are such that the full speed of the cutter bar is at once obtained, while during the forward or cutting-off motion the movement is initially slow and gradually increases, and is assisted by the spring 94. In this respect, the mechanism differs from prior cut-off movements with which I am familiar which are usually actuated by cams or other parts in which the commencement of the retracting movement is slow and gradually increases, and the spring tension is in the opposite direction from that shown herein, so that while the stock is being cut off, the spring pressure has to be overcome.

I have shown, (Fig. 6), the cutter 76 as consisting of a square plate having a plurality of cutting notches, any one of which may be brought into operative position by turning the plate on its central clamping screw, or by reversing the plate.

After the stock has been cut off by the action of the mechanism just described, the continued forward movement of the cutter bar and cutter carries the cut-off piece into alinement with one of the dies of the turret, (at the station 45 of Fig. 6), being held in the notch of the cutter 76 during this movement by the finger 95 of the fiddle bow lever 96 having the spring 97. This fiddle bow lever is carried by the fiddle bow bar 98, which is connected to the rear end of the cutter bar 77 and has a sliding bearing in a guide 99 on the frame, the spring 97 maintaining sufficient pressure upon the finger 95 to hold the cut-off piece in the notch of the cutter 76 as the latter moves forwardly. 100 is an adjusting screw for the cutter bar to determine the limit of its forward movement, so as to bring the stock into alinement with the die. 100ª (best shown in Fig. 6) designates an adjustable stop against which the carrier finger 95 strikes when the cutter bar is retracted. The function of this stop is to hold the carrier finger out of interference with the stock which is to be fed through the cut-off die. After the cut-off piece has thus been moved into alinement with the die 45, it is inserted into said die by a reciprocating push-in rod 101, which, together with its actuating mechanism, is shown in detail in Fig. 13. This rod is adjustably secured in a slide 102, which is arranged to reciprocate in a guide-groove 103 in the upper end of the punch plate 23, (see Figs. 7, 8 and 10). The adjustment of the rod 101 is secured by means of the screw 104. This screw being loosened, the rod may be adjusted by means of the projecting pin 105. The slide 102 is actuated by a lever 106 pivoted at 107 and itself actuated by a connection 108 with a lever 109 fulcrumed at 109ª and moved by a cam 110 on the main shaft 2. The clamping screw 107 for the lever 106 is carried by a strap 111, which surrounds the lever, the lower end of the screw being threaded into a swivel nut 112 seated in a shoe or slide 113 which is arranged to move longitudinally in a slideway 114 which extends at an angle to the axis of the machine. The upper end of the nut 112 is squared into the strap 111, as shown in Figs. 15 and 16, to cause the nut to turn with the lever 106. By loosening the pivot screw 107, the slide 113 may be moved forwardly or back and then clamped to the lever 106, thus varying the lengths of the two arms of the lever and changing the stroke of the push-in rod 101. By reference to Fig. 13, it will be seen that the axis of the slideway 114 is parallel to the axis of the lever 106 when the latter is in its forward position, so that this adjustment can be effected to change the throw of the rod 101 without changing the point to which said rod is moved forwardly. That is to say, the adjustments of the rod 101 for forward position and for throw are independent of each other. The movement of the rod 101 is timed to take place just as the cutter bar 77 reaches its extreme point of forward movement, and acts to push the cut-off piece of stock into the die at the station 45.

The length of the pieces cut off is accurately determined by the position of the adjustable feed-stop 115. This device consists of a rod which is adjustably mounted in the line of feed opposite the advancing end of the stock, its adjustment being secured by the screw 116, (Figs. 13 and 14). This stop rod is mounted in a pivoted block 117 which is normally held in the position shown in Fig. 14 by means of the spring 118. This block has a forwardly projecting pawl arm 119 which terminates in the beveled end 120, designed for contact with the correspondingly beveled end 121 of the cutter bar 77, (Fig. 6). The purpose of this pivoted block 117 is as follows:—When the feed stop 115 is adjusted forwardly for a very short cut of the stock, it is in the path of movement of the cutter bar 77. By pivoting the block 117 in the manner described, as the cutter 77 advances, its beveled portion 121 contacts with the beveled face 120 of the pawl arm 119 and thereby rocks the block 117 on its pivot and depresses the feed-stop below the path of the cutter bar.

119ᵃ is a pin or stop for limiting the upward movement of the pawl-arm 119.

After the cut-off piece is delivered into the die at station 45, the turret is turned to a quarter of a revolution, bringing the cut piece to station 46, into position to be acted on by the punch 10 which now advances. This punch partially shapes the head, and while the gate or head 9 is moving back, the turret is advanced another quarter revolution, bringing the partly shaped bolt or rivet to station 47, into position to be acted upon by the larger finishing punch 11. The gate or head 9 again moves backwardly and the turret is given another quarter revolution, bringing the finished bolt or rivet to station 48, into the position to be ejected. This ejection is accomplished by means of the four ejecting or knock-out pins 122, which are seated in four openings in the spiral gear 30 which is attached to the turret 29, (see Fig. 4). These openings are in line with the four dies in the turret 29, and the points of the pins 122 enter the holes in the dies and serve as anvils at the stations 46 and 47 where the punches are acting. These pins are successively actuated by the reciprocating knock-out rod 123, which has an actuating connection 124 with a crank arm 125 of a rocker shaft 126, a depending arm 127 of which has an actuating connection 128 with an arm 129 of a rocker mounted on a stud 130 and actuated by a cam 131 on the main shaft 2, (see Figs. 1, 3, 4 and 18).

132 is a spring which acts on the rocker arm 129.

The connection between the connecting rod 128 and the rocker arm 129 is effected by means of the adjustable shoe 133, (Figs. 18 and 19), which is movably secured in a slot or guide-way 134 of said arm, by means of the screw 135, thus providing means for adjusting the throw of the knock-out rod 123 to carry the points of the ejecting pins flush with the faces of the turret dies, the pins being provided with heads on their rear ends and made with a length of body exactly corresponding with the length of the dies through which they pass.

As the finished bolt or rivet is ejected from the die at station 48, it falls into the guide chute 136, (see Fig. 7), and falls down the inclined bottom 137 thereof and thence down and out of the machine. This guide is hinged at 137ᵃ to enable it to be thrown back out of the way.

In the manufacture of certain kinds of articles, such as carriage bolts having a square or other enlargement of the body below the head, it is necessary to provide for a certain amount of relief in the finishing die. In my improved machine this is readily effected by means of the relief screw 138, (see Fig. 4), which has a threaded bearing in the frame portion 139, which said frame portion forms a solid backing for the turret and its spiral gear, and through which the knock-out rod 123 works. This screw is placed at station 47 directly in line with the finishing punch 11, being secured in its adjustment by means of the set screw 140 on the copper plug 140ᵃ. In the manufacture of bolts and rivets requiring no relief, this screw 138 is adjusted so that its forward end 138ᵃ is flush with the forward face of the frame portion 139, in which position it forms a solid backing for the pin 122 at the same level as the backing for said pin at station 46. When, however, it is desired to provide relief, this screw 138 is retracted, as shown in Fig. 4, enough to allow a part of the metal which has been upset by the blow of the first punch to flow into the die under the blow of the second punch, and thus supply the extra metal needed for the enlargement under the head of the bolt or rivet. The face of the frame portion 139 is provided with the groove 141, shown in Fig. 4, and indicated in dotted lines in Fig. 6. This groove provides clearance for the movement of the rear end of the pin 122 when the latter has been forced back into the relief space and it is being carried by the quarter revolution of the turret 29 from the station 47 to station 48. I desire to call particular attention to the simplicity of this adjustably-fixed relief device, as compared with the complication of the actuated relief mechanisms which have heretofore been necessary for this purpose, in this general class of machines. The simple relief is made possible in my machine, by the use of a multiplicity of dies and operating stations.

It is believed that the operation of the machine will be readily understood from the descriptions which have been given in connection with the description of the various parts, but the operation may be briefly resumed as follows:—The stock is fed in by the mechanism described, and is cut into successive lengths by the reciprocating cutter 76, the cut piece being carried forwardly thereby into line with the die at the receiving station of the turret, into which it is forced by the reciprocating push-in device. The turret is then given a quarter revolution to bring the piece to the action of the first punch, and a second quarter revolution to bring it to the action of the finishing punch, and a further quarter revolution to bring the finished bolt or rivet into position to be ejected. During one cycle of the machine, a new piece of stock has been introduced into a die of the turret at the receiving station and its three predecessors have in their order, been upset by the first punch, finished by the second punch and ejected.

Various changes may be made in the construction and arrangement of the various parts without departing from the spirit and scope of my invention. Thus, while I have shown all of the actuating mechanism for the several parts as being operated by cams or eccentrics, on the main shaft of the machine, it will be readily understood that these operations may be effected in various ways and by various means. I may provide the turret with more than four dies, either with or without a corresponding increase in the number of punches, according to the particular article to be made. I may also use other forms of die carriers in lieu of the rotary turret, which will have a plurality of dies and operating stations, with two or more punches acting simultaneously at a corresponding number of stations.

What I claim is:—

1. In a heading machine, a rotary die carrier having a plurality of dies and a receiving station, two heading stations, heading mechanism at each of the heading stations and an ejecting station, an ejecting pin in each of the dies, a backing for said pins whereby they act as anvils at the heading stations, and a knock-out device working through the backing into the turret at the ejecting station, and means for actuating the knock-out device to carry the forward end of the ejecting pin through to the forward end of the die carrier to eject the finished articles, substantially as described.

2. In a heading machine, a rotary turret having a plurality of dies or holders, an actuating gear behind the turret and having openings corresponding to the dies, means for periodically actuating the gear, an abutment for the gear and turret, and a relief member seated in said abutment in line with one of said openings and dies; substantially as described.

3. In a heading machine, a rotary turret having a plurality of dies or holders, an actuating gear behind the turret and secured thereto, ejecting devices arranged to work through the gear into the dies, and a relief member in line with one of said openings and dies; substantially as described.

4. In a heading machine, a rotary die carrier having a plurality of dies, an ejecting pin in each die and free to move therein through to the outer face of the die, and means for actuating said pin, said pin and actuating means being arranged to permit the free intermittent rotary movement of the carrier; substantially as described.

5. In a cold heading machine, a rotary turret having a plurality of dies or holders therein and also having a plurality of peripheral seats extending obliquely to the axis of the turret, and locking teeth secured in said seats, said teeth having seating portions which fit the oblique seats in the turret and projecting portions which are parallel to the axis of the turret, said oblique seats and seating portions providing for a correct initial adjustment of the teeth, substantially as described.

6. In a heading machine, a rotary turret having a plurality of dies or holders therein, means for periodically rotating the turret, said turret also having spaced, peripheral beveled, locking teeth, and a reciprocating locking dog having wedge-shaped yielding jaws arranged to engage said teeth, the rearward of said jaws being of greater length than the other and forming an abutment to prevent the locking teeth from passing the jaws when engaged thereby; substantially as described.

7. In a heading machine, a rotary turret having a plurality of dies or holders therein, means for periodically rotating the turret, said turret also having spaced, peripheral beveled locking teeth, and a reciprocating locking dog having wedge-shaped yielding jaws arranged to engage said teeth, spring means for moving the locking dog into locking engagement with said teeth, and positively actuated connections for withdrawing the dog; substantially as described.

8. In a heading machine, heading punches, a reciprocating carrier therefor, a laterally adjustable punch-clamp for each punch, and vertically-adjustable punch plates to which the punch clamps are adjustably and independently secured; substantially as described.

9. In a heading machine, a reciprocating head or gate, endwise adjustable heading punches carried thereby, a pivoted clamping member for each punch arranged to effect an independent lateral adjustment thereof, and vertically-adjustable members to which the clamping members are independently pivoted; substantially as described.

10. In a machine of the class described, the combination with a reciprocating push-in device, of a reciprocating cutter bar, a swinging actuating member connected to said bar, and actuating connections for said member, the centers of movement of said member and connections being arranged to give said bar a maximum speed at the beginning of its retracting movements whereby the cutter carried by said bar will be quickly withdrawn out of the path of the push-in device, substantially as described.

11. In a heading machine, a reciprocating cutter bar, an actuating slide therefor arranged to reciprocate at an angle to the cutter bar, and a lever and link connection between the slide and cutter bar; substantially as described.

12. In a machine of the class described, a reciprocating cutter bar, an actuating slide therefor working at an angle thereto, a rocker lever actuated by the slide, and a link connecting the lever with the cutter bar; substantially as described.

13. In a machine of the class described, a reciprocating cutter bar, an actuating slide therefor working at an angle thereto, a pivoted lever having a slot in one of its arms arranged to be engaged and disengaged by the slide, and a link connecting the lever with the cutter bar; substantially as described.

14. In a machine of the class described, a reciprocating cutter bar, an actuating slide therefor working at an angle thereto, a pivoted lever having a slot in one of its arms arranged to be engaged and disengaged by the slide, a link connecting the lever with the cutting bar, and a spring acting on the cutter bar and assisting in its cutting movement and locking it in its forward and retracted positions; substantially as described.

15. In a machine of the class described, means for feeding the stock, an adjustable feed stop for the stock, a reciprocating cutter, and means whereby the forward movement of the cutter moves the feed stop out of the path thereof; substantially as described.

16. In a machine of the class described, means for feeding the stock, an adjustable feed stop therefor, a pivoted carrier for the feed stop, and a reciprocating cutter carrier arranged to actuate the feed stop carrier to move the feed stop out of the path of the cutter-carrier; substantially as described.

17. In a machine of the class described, means for feeding the stock, an adjustable feed stop, means for cutting the stock, and means actuated by the cutting movement of the cutter-bar for moving the feed stop out of its path; substantially as described.

18. In a heading machine, the combination with a rotary turret having a plurality of dies, and a movable punch carrier, of a stock cutter for cutting the stock, and also forming a carrier to bring the cut stock into line with one of the dies, a push-in device connected to a relatively fixed portion of machine, and movable independently of the punch carrier, and means whereby the movement of said device can be regulated as to time and speed independent of the movement of the punch carrier; substantially as described.

19. In a heading machine, the combination with a reciprocating heading tool, of a push-in device connected to a relatively fixed portion of the machine and movable independently of the heading tool, and means whereby the movement of the push-in device can be regulated as to time and speed independently of the movement of the punch carrier; substantially as described.

20. In a heading machine, the combination with a die or holder, of a reciprocating push-in rod working in line with the die or holder, an oscillating lever for actuating the rod, and means for changing the fulcrum point of said lever along a line parallel with the longitudinal axis of the lever in its forward position to change the stroke of the rod without changing the limit of its forward movement; substantially as described.

21. In a heading machine, the combination with a rotary die carrier turret, means for periodically locking, releasing and rotating the turret, and means for heading the blanks in the turret dies, of a push-in device for introducing the blanks into the dies, and means for actuating said device at a greater relative speed than that of the heading means together with mechanism for ejecting the finished articles from the dies, substantially as described.

22. In a heading machine, a movable die-carrying member having a plurality of holders or dies, and a relief member in line with and behind one of the dies, said member being normally in fixed relation to the die-carrying member; substantially as described.

23. In a heading machine, a movable die-carrier having a plurality of dies, an adjustable relief member in line with one of the dies and stationary in its adjusted positions; substantially as described.

24. In a heading machine, a heading punch, a reciprocating carrier therefor, a laterally adjustable punch clamp for the punch having an adjustably fixed tapered pivot pin, and a vertically adjustable punch plate to which the punch clamp is adjustably pivoted by the said pin; substantially as described.

25. In a heading machine, a movable die-carrier having a plurality of working stations, a fixed support or abutment in the rear of the carrier, a relief member seated in said abutment in line with one of the stations, said member being normally fixed with respect to the die-carrier, and means for adjusting said member; substantially as described.

In testimony whereof I have hereunto set my hand.

CHAS. S. WEEKS.

Witnesses:
JOHN MILLER,
H. M. CORWIN.